US010203929B2

(12) United States Patent
Greenberger et al.

(10) Patent No.: US 10,203,929 B2
(45) Date of Patent: *Feb. 12, 2019

(54) EXTENDABLE DISPLAY STRIPS

(71) Applicant: International Business Machines Corporation, Armonk, NY (US)

(72) Inventors: Jeremy A. Greenberger, Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,888

(22) Filed: Jun. 13, 2017

(65) Prior Publication Data

US 2018/0357031 A1 Dec. 13, 2018

(51) Int. Cl.
| | |
|---|---|
| *G09G 5/10* | (2006.01) |
| *G06F 3/14* | (2006.01) |
| *G06F 3/147* | (2006.01) |
| *G06F 1/16* | (2006.01) |
| *G06F 9/30* | (2018.01) |
| *G06F 21/02* | (2006.01) |
| *G09F 21/02* | (2006.01) |
| *G09F 9/30* | (2006.01) |

(52) U.S. Cl.
CPC ............ *G06F 3/1446* (2013.01); *G06F 1/163* (2013.01); *G06F 1/1649* (2013.01); *G06F 1/1679* (2013.01); *G06F 3/147* (2013.01); *G09F 9/30* (2013.01); *G09F 21/026* (2013.01)

(58) Field of Classification Search
CPC ........ G06F 3/1446; G06F 3/147; G06F 1/163; G06F 1/1649; G06F 3/1423; G06F 3/1431; G06F 3/1679; G09F 9/30; G09F 21/026

See application file for complete search history.

(56) References Cited

U.S. PATENT DOCUMENTS

| | | |
|---|---|---|
| 8,275,420 B2 | 9/2012 | Lim |
| 8,385,992 B2 | 2/2013 | Davidson et al. |
| 8,462,126 B2 | 6/2013 | Cholewin et al. |
| 8,514,179 B2 | 8/2013 | Griffen |

(Continued)

OTHER PUBLICATIONS

Happich, Julien, "Imec laminates stretchable LED display onto garments", EE Times Europe, Sep. 2, 2015, 5 pages, <http://www.electronics-eetimes.com/news/imec-laminates-stretchable-led-display-garments>.

(Continued)

*Primary Examiner* — Sardis F Azongha
(74) *Attorney, Agent, or Firm* — Tihon Poltavets (57) ABSTRACT

An apparatus for an extendable display strip, the apparatus includes a first display panel coupled to a second display panel, where the second display panel is capable of extending and retracting beneath a bottom surface of the first display panel. The apparatus also includes an elastic based coupled to the first display panel and the second display panel, where a first portion of the bottom surface of the first display panel is coupled to the elastic base and a first portion of a bottom surface of the second display panel is coupled to the elastic base, where the extending and the retracting of the second display panel beneath the bottom surface of the first display panel is based on an extending and a retracting of the elastic base.

19 Claims, 6 Drawing Sheets

(56) References Cited

U.S. PATENT DOCUMENTS

| | | | |
|---|---|---|---|
| 8,823,639 B2 | 9/2014 | Jackson et al. | |
| 8,876,746 B2 | 11/2014 | Davison et al. | |
| 8,947,344 B2* | 2/2015 | Cho | G06F 3/041 |
| | | | 345/1.1 |
| 9,286,812 B2 | 3/2016 | Bohn et al. | |
| 9,349,969 B2 | 5/2016 | Kwon et al. | |
| 9,589,529 B2 | 3/2017 | Kim | |
| 9,614,022 B2 | 4/2017 | Miyake et al. | |
| 9,658,647 B1 | 5/2017 | Safar | |
| 9,720,637 B2 | 8/2017 | Kim | |
| 9,723,732 B2 | 8/2017 | van der Walde | |
| 9,756,723 B2 | 9/2017 | Hong et al. | |
| 9,887,591 B2 | 2/2018 | Breedvelt-Schouten et al. | |
| 2005/0285811 A1 | 12/2005 | Kawase et al. | |
| 2006/0039098 A1 | 2/2006 | Slikkerveer et al. | |
| 2007/0001927 A1 | 1/2007 | Ricks et al. | |
| 2007/0076861 A1 | 4/2007 | Ju | |
| 2007/0247798 A1 | 10/2007 | Scott, II | |
| 2008/0144265 A1 | 6/2008 | Aoki | |
| 2008/0207273 A1 | 8/2008 | Huo | |
| 2009/0009423 A1 | 1/2009 | Huang et al. | |
| 2010/0056224 A1 | 3/2010 | Kim | |
| 2010/0060547 A1* | 3/2010 | Bloebaum | G06F 1/1624 |
| | | | 345/1.3 |
| 2011/0057861 A1 | 3/2011 | Cok et al. | |
| 2011/0176260 A1 | 7/2011 | Walters et al. | |
| 2012/0159988 A1 | 6/2012 | Baird et al. | |
| 2012/0268445 A1 | 10/2012 | Ogata et al. | |
| 2015/0003905 A1 | 1/2015 | Cowen et al. | |
| 2015/0028316 A1 | 1/2015 | Kojima et al. | |
| 2015/0161937 A1* | 6/2015 | Locker | G06F 3/1446 |
| | | | 345/1.3 |
| 2015/0378393 A1* | 12/2015 | Erad | G06F 1/1616 |
| | | | 345/1.3 |
| 2016/0132281 A1* | 5/2016 | Yamazaki | G06F 3/1446 |
| | | | 345/1.3 |
| 2016/0183364 A1 | 6/2016 | Choi et al. | |
| 2016/0205743 A1 | 7/2016 | Shim et al. | |
| 2016/0321024 A1 | 11/2016 | Jin et al. | |
| 2017/0038794 A1* | 2/2017 | Song | G09F 9/00 |
| 2018/0129246 A1* | 5/2018 | Ko | G06F 1/16 |

OTHER PUBLICATIONS

Johnson, R. Colin, "Stretchable OLEDs for Displays, Lighting", EE Times, News & Analysis, Sep. 27, 2013, 6 pages, <http://www.eetimes.com/document.asp?doc_id=1319653>.

Kim et al., "Flexible and Stretchable Electronics for Biointegrated Devices", Annu. Rev. Biomed. Eng. 2012. 14: pp. 113-128, First published online as a Review in Advance on Apr. 18, 2012, Downloaded from www.annualreviews.org, doi: 10.1146/annurev-bioeng-071811-150018, Copyright © 2012 by Annual Reviews.

Lu et al., "Flexible and Stretchable Electronics Paving the Way for Soft Robotics", Soft Robotics, vol. 1, No. 1, 2013, © Mary Ann Lieber Inc., DOI: 10.1089/soro.2013.0005, pp. 53-62.

"Researchers Develop Highly Stretchable Electroluminescent 'Skin'", Science News, Mar. 4, 2016, 6 pages, <http://www.sci-news.com/technologies/highly-stretchable-electroluminescent-skin-03678.html>.

IBM, List of IBM Patents or Patent Applications Treated as Related, Appendix P, dated Dec. 22, 2017, 2 pages.

Pending U.S. Appl. No. 15/814,909, filed Nov. 16, 2017, entitled: "Extendable Display Strips", 31 pages.

\* cited by examiner

EXTENDABLE DISPLAY STRIPS

FIELD OF THE INVENTION

This disclosure relates generally to electronic devices, and in particular, to extendable displays on electronic devices.

BACKGROUND OF THE INVENTION

Typically, expandable display devices utilize LEDs to project an image on an expandable display surface that is viewable by a user. Expandable display devices allow for content to be displayed on a surface, where the surface is not flat plane, such as a wrist of a user or an exterior surface of a train car. As the user applies a force on an end portion of the expandable display surface, the expandable display surface is stretched and an image deformation occurs due to the constant amount of LEDs having to compensate for an increase in an effective display area of the expandable display device.

SUMMARY

One aspect of an embodiment of the present invention discloses an apparatus for an extendable display strip, the apparatus comprising, a first display panel coupled to a second display panel, wherein the second display panel is capable of extending and retracting beneath a bottom surface of the first display panel; and an elastic based coupled to the first display panel and the second display panel, wherein a first portion of the bottom surface of the first display panel is coupled to the elastic base and a first portion of a bottom surface of the second display panel is coupled to the elastic base, wherein the extending and the retracting of the second display panel beneath the bottom surface of the first display panel is based on an extending and a retracting of the elastic base.

A second aspect of an embodiment of the present invention discloses a method comprising, determining, by one or more processors, an effective display area across at least two display panels of an extendable display strip, wherein a first display panel overlaps a portion of a second display panel of the at least two display panels; displaying, by one or more processors, content in the effective display area across the at least two display panels, wherein the content is displayed as a single image across the at least two display panels; and responsive to determining the effective area across the at least two display panels has changed, determining, by one or more processors, a new effective display area across the least two display panels.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

Figure 1A:
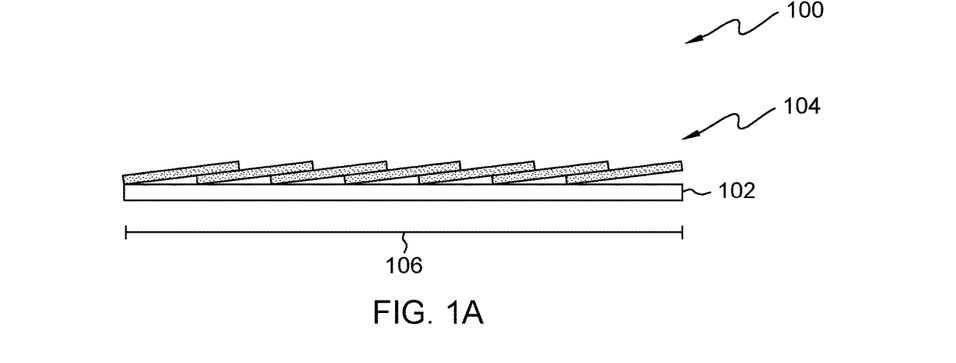
FIG. 1A illustrates an extendable display strip in a contracted state, in accordance with an embodiment of the present invention.

FIG. 1A illustrates an extendable display strip in a contracted state, in accordance with an embodiment of the present invention. In this embodiment, extendable display strip 100 includes elastic portion 102 and display strips 104. Display strips 104 are arranged in a staggered manner and coupled to elastic portion 102, where a bottom portion of each of display strips 104 is coupled to elastic portion 102. In this embodiment, elastic portion 102 is a rubber-based material capable of extending and contracting depending on a force applied to each end of extendable display strip 100. In other embodiments, elastic portion 102 can represent any known material in the art capable of extending from and contracting to an original length and width. Contracted length 106 represents extendable display strip 100 in a contracted state, where no external force is being applied to elastic portion 102 of extendable display strip 100.

In one embodiment, extendable display strip 100 is a wearable electronic device that is worn on a wrist by a user. Extendable display strip 100 can include clasps on either end of elastic portion 102, for securing extendable display strip 100 on the wrist of the user. The contracted state can represent an instance where the user is not wearing extendable display strip 100 and an extended state can represent an instance where the user is wearing extendable display strip 100. The extended state of extendable display strip 100 can represent a normalized state of the user wearing the electronic device and can be based on a position of the clasps of either end of elastic portion 102. The contracted state of extendable display strip 100 can represent a resting state, where extendable display strip 100 can power off each of display strips 104 to conserve an onboard power supply. Additionally, extendable display strip 100 can increase a base volume setting to alert a user of any notifications since each of display strips 104 are powered off.

Figure 1B:
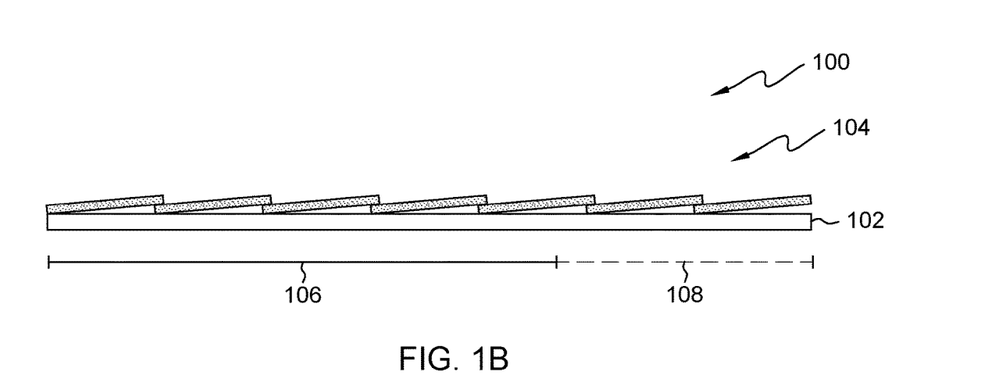
FIG. 1B illustrates an extendable display strip in an extended state, in accordance with an embodiment of the present invention.

FIG. 1B illustrates an extendable display strip in an extended state, in accordance with an embodiment of the present invention. In this embodiment, extendable display strip 100 of FIG. 1A is in an extended state, where an external force is applied to at least one end of elastic portion 102 of extendable display strip 100. As an external force is applied to elastic portion 102, extendable display strip 100 extends an additional length 108 from contracted length 106. Length 108 represents an operable range of length for which extendable display strip 100 can extend. As extendable display strip 100 extends from contracted length 106, each of display strips 104 extends a length proportional to the total length that extendable display strip 100. Since each of display strips 104 is a fixed length, an area for which any two display strips overlap reduces as extendable display strip 100 extends length 108.

Figure 2A:
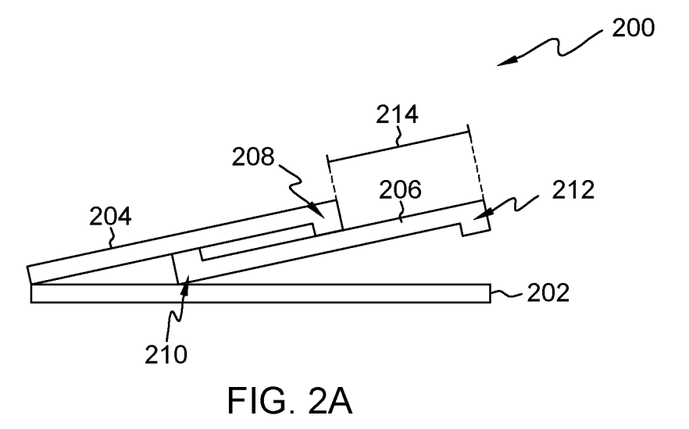
FIG. 2A illustrates a portion of an extendable display strip in a contracted state, in accordance with one embodiment of the present invention.

FIG. 2A illustrates a portion of an extendable display strip in a contracted state, in accordance with one embodiment of the present invention.

In this embodiment, extendable display strip 200 includes at least elastic portion 202, display panel 204, and display panel 206. A bottom portion of display panel 204 and a bottom portion of display panel 206 are coupled to elastic portion 202 in such a manner that allows display panel 206 to slide beneath display panel 204. Display panel 204 includes bottom lock 208 and display panel 206 includes top lock 210 and bottom lock 212. Bottom lock 208 of display panel 204 and top lock 210 of display panel 206 are capable of interlocking in such a manner that prevents display panel 206 from extending past a portion of display panel 204. Display panel 204 is situated on top of display panel 206 and as a result, the full display area of display panel 204 is visible to a user. Display panel 206 is situated beneath display panel 204 and as a result, only a portion of a display area of display panel 206 is visible to the user. The portion of the display area of display panel 206 that is visible to the user is equal to length 214. In this embodiment, the portion of the display area of display panel 206 is activated, while the remaining portion of the display area of display panel 206 remains inactive to conserve power being supplied to display panel 206.

The display area of display panel 204 and the display area of display panel 206 can include a scratch resistant surface and an anti-rubbing coating to allow for display panel 206 to slide freely beneath display panel 206. In this embodiment, display panel 204 and display panel 206 can each include embedded magnetic layers, where an embedded magnetic layer of display panel 204 is a polar opposite of an embedded magnetic layer of display panel 206. As a result, the embedded magnetic layer of display panel 204 is pulled towards the embedded magnetic layer of display panel 206, therefore coupling display panel 204 to display panel 206. In an alternative embodiment, display panel 204 includes a rail system on at least one side of a bottom portion of the display panel 204 which joins with a rail system on at least one side of a top portion of the display panel 206, where the two rail systems interconnect to allow for display panel 206 to extended and contract beneath display panel 204.

Display panel 204 and display panel 206 can each include flexible connectors which allow for power to be supplied without interruption to display panel 204 and display panel 206 in either of the contracted state or the extended state. In this embodiment, the flexible connectors are embedded in elastic portion 202 of extendable display strip 200 and an electrical contact is provided at a location where a bottom portion of display panel 204 and display panel 206 are coupled to elastic portion 202. Display panel 204 and display panel 206 can each include processor and a touch based display, where the touch based display is capable of detecting when an overlaying display panel is covering a portion of a display area of a display panel. For example, a touch display located on a top portion of display panel 206 can detect that an overlaying display panel (i.e., display panel 204) is covering a portion of a display area of display panel 206 based on the location where bottom lock 208 is in contact with touch display of display panel 206.

In one embodiment, display panel 204 and display panel 206 are transparent displays, where display panel 204 and display panel 206 are each capable of displaying content while maintaining a particular level of transparency. Additionally, display panel 204 and display panel 206 can display content with a mirrored background depending on a preference of a user utilizing extendable display strip 200. Since elastic portion 202 of extendable display strip 200 allows display panel 206 to slide beneath display panel 204, a portion of display panel 206 remains beneath display panel 204 at various positions of elastic portion 202. Display panel 204 and display panel 206 being transparent displays allows for display panel 206 to augment display panel 204 for the portion where display panel 206 is beneath display panel 204. Extendable display strip 200 can be configured in various lengths and widths depending on a surface area to be covered by extendable display strip 200, for example, five transparent display panels by ten transparent display panels.

Figure 2B:
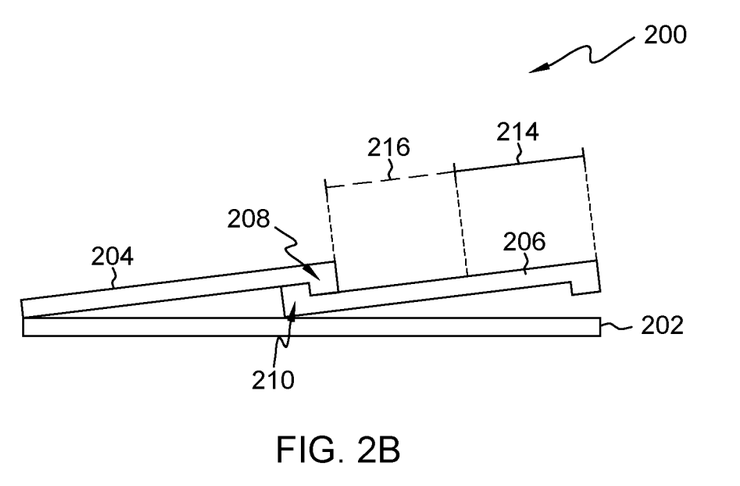
FIG. 2B illustrates a portion of an extendable display strip in an extended state, in accordance with one embodiment of the present invention.

FIG. 2B illustrates a portion of an extendable display strip in an extended state, in accordance with one embodiment of the present invention.

In this embodiment, extendable display strip 200 includes elastic portion 202, display panel 204, and display panel 206 from FIG. 2A in an extended state. As a force is applied to either end of elastic portion 202 of extendable display strip 200, elastic portion 202 extends out from a contracted state as previously illustrated in FIG. 2A. As elastic portion 202 extends, display panel 206 extends out beneath display panel 204 a distance proportional to a length that elastic portion 202 extends. In this embodiment, display panel 206 extends out beneath display panel 204 to reveal a portion of display area equal to length 216, where length 214 represents the display of display panel 206 that is visible to user when extendable display strip 200 is in the contracted state. As display panel 206 extends out beneath display panel, bottom lock 208 of display panel 204 interlocks with top lock 210 of display panel 206. The interlocking of bottom lock 208 and top lock 210 prevents display panel 206 from completely extending out from beneath display panel 204. As bottom lock 208 slides along the display area of display panel 206, an effective display area of display panel 206 becomes greater. In this embodiment, the maximum effective display area of display panel 206 is when bottom lock 208 interlocks with top lock 210. Since the width of display panel 206 is fixed, the maximum extension of display panel 206 (i.e., length 214+length 216) allows for the maximum effective display area. In another embodiment, along with a length of display panel 206, a width of display panel 206 is also extendable.

Figure 3A:
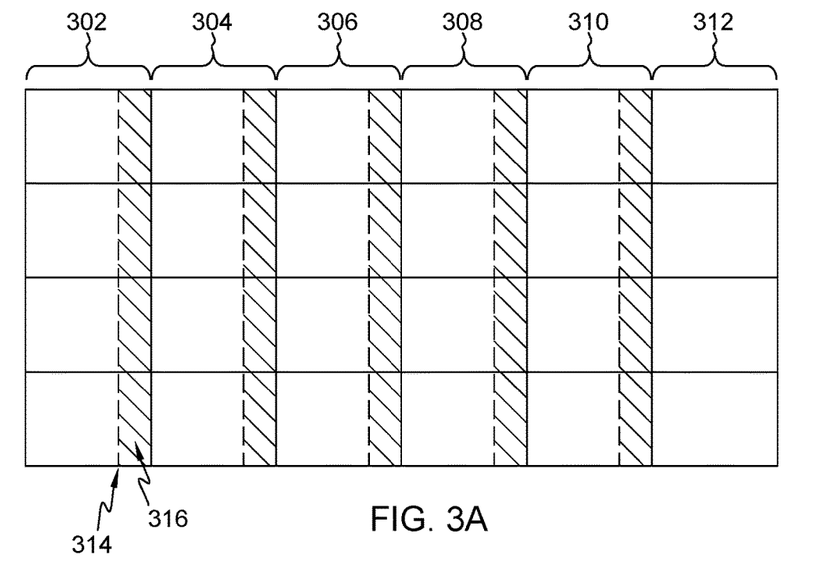
FIG. 3A illustrates an overhead view of an extendable display strip in a contracted state, in accordance with one embodiment of the present invention.

FIG. 3A illustrates an overhead view of an extendable display strip in a contracted state, in accordance with one embodiment of the present invention. In this embodiment, an extendable display strip includes 24 total display panels in a 6×4 configuration, where the display panels extend length wise on the extendable display strip. Length 302, 304, 306, 308, 310 and 312 represent a length of an effective display area for display panels in the first row, the second row, the third row, the fourth row, the fifth row, and the sixth row, respectively. Length 302 is the total length for each of the 4 overlaying display panels in the first row, which have a constant effective display area that is non-varying. In this embodiment, lengths 304, 306, 308, 310, and 312 are equal to one another and correlate to how much an elastic portion of the extendable display strip contracts and extends. Since the extendable display strip is in a contracted state, lengths 304, 306, 308, 310, and 312 represents the minimum length of the effective display area for the remaining 20 display panels in rows two through six. Area 316 represents a portion of display area of the second row of display panels that is not visible to a user due to an overlaying of the first row of display panels. Line 314 represents where the second row of display panels is contracted beneath the first row of display panels.

In one embodiment, each of the six rows extend and retract at the same rate and a sum of lengths of extension and retraction of the six rows equals the length of extension and retractions of the elastic base. In another embodiment, the second row may extend and retract from beneath the first row at a first rate and the third row may extend and retract from beneath the second row at a second rate, where the first rate does not equal the second rate.

Figure 3B:
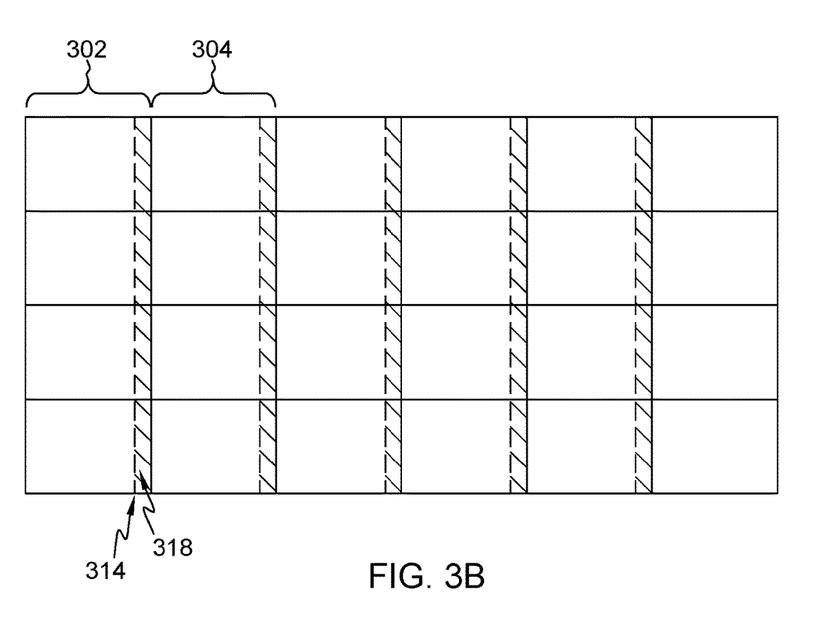
FIG. 3B illustrates an overhead view of an extendable display strip in an extended state, in accordance with one embodiment of the present invention.

FIG. 3B illustrates an overhead view of an extendable display strip in an extended state, in accordance with one embodiment of the present invention. In this embodiment, the extendable display strip from FIG. 3A is in an extended state. As previously mentioned, length 302 is the total length for each of the 4 overlaying display panels in the first row, which have a constant effective display area that is non-varying. However, length 304 is varying and increases as the extendable display strip is in the extended state. As length 304 increases, the total effective display area of the second row of display panels of the extendable display strip increases as well. Line 314 representing where the second row of display panels is contracted beneath the first row of display panels moves proportionally to the increase in length 304. As a result, area 318 is smaller relative to area 316 of FIG. 3A, where area 318 represents a portion of display area of the second row of display panels that is not visible to the user due to the overlaying of the first row of display panels while in the extended state.

The terminology used herein is for the purpose of describing particular embodiments only and is not intended to be limiting to the invention. As used herein, the singular forms "a", "an" and "the" are intended to include the plural forms as well, unless the context clearly indicates otherwise.

Having described preferred embodiments of an extendable display strip (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

Figure 4:
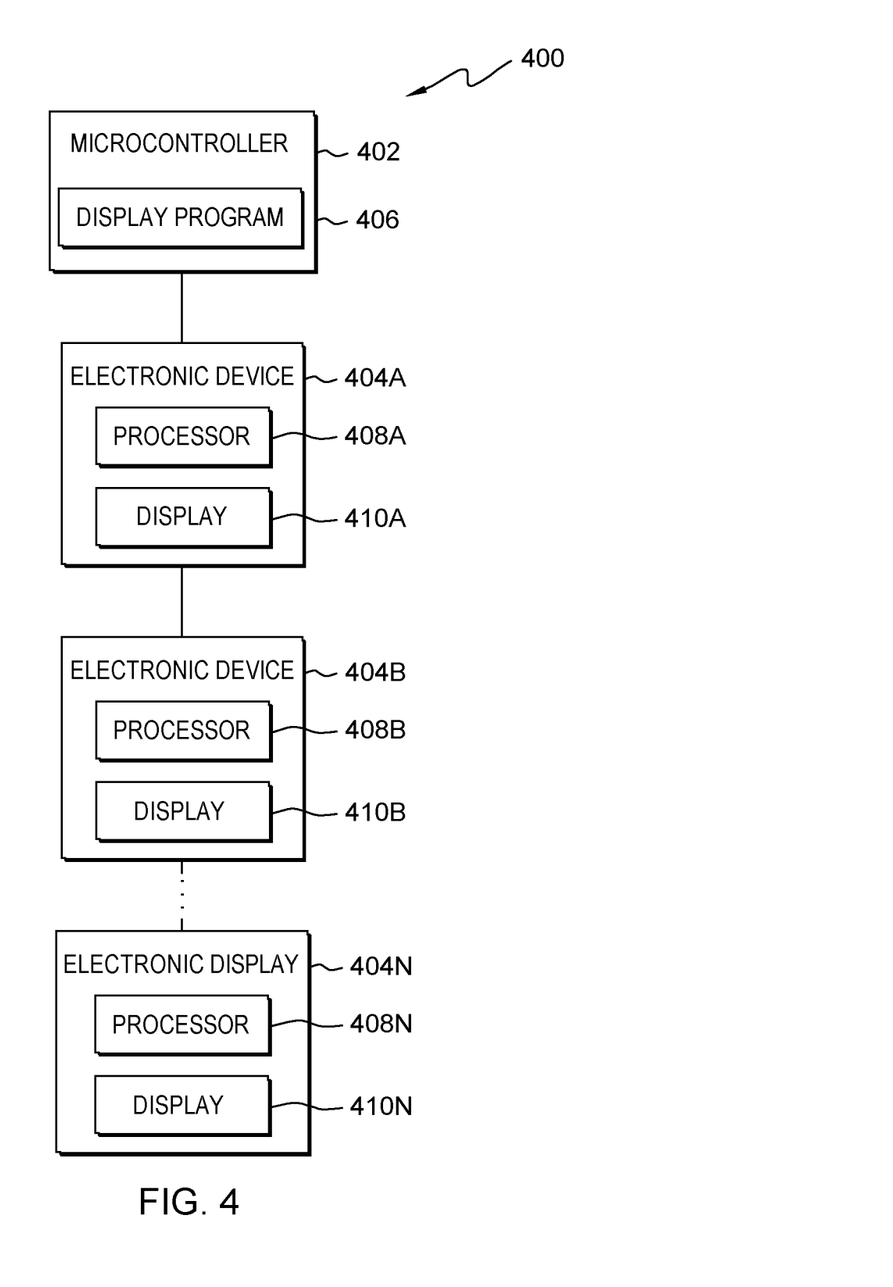
FIG. 4 is a functional block diagram illustrating a distributed data processing environment, in an embodiment, in accordance with the present invention.

FIG. 4 is a functional block diagram illustrating a distributed data processing environment, in an embodiment in accordance with the present invention. The distributed data processing environment includes extendable display strip 400 with microcontroller 402, electronic device 404A, electronic device 404B, and electronic device 404N.

Microcontroller 402 includes display program 406 for determining an effective display area for a number of display panels (e.g., electronic device 404A and 404B) configured in a stacked manner. Display program 406 has the ability to determine an effective display area for each of display 410A, 410B, and 410N of electronic device 404A, 404B, and 404N, respectively. Display program 406 can display content in the effective display area on each of display 410A, 410B, and 410N, where the content is displayed as a single image across display 410A, 410B, and 410N. Display program 406 can determine whether the effective display area has changed and determine a new effective display area for displaying content in display 410A, 410B, and 410N. Subsequently, display program 406 displays content in the new effective display area in display 410A, 410B, and 410C of electronic device 404A, 404B, and 404N, respectively.

Electronic device 404A, 404B, 404N may be any programmable computer system known in the art representing a display panel. Electronic device 404A, 404B, 404N includes processors 408A, 408B, and 408N, respectively, and may include a client based display program 406, not illustrated in FIG. 4. In general, electronic device 404A, 404B, 404N is representative of any programmable electronic device or combination of programmable electronic devices capable of executing machine-readable program instructions and communicating with users of other electronic devices via a network (local or remote). Electronic device 404A, 404B, 404N may include components, as depicted and described in further detail with respect to FIG. 6, in accordance with embodiments of the present invention.

Electronic device 404A, 404B, 404N also includes display 410A, 410B, and 410N, respectively for display content to a user. Display 410A, 410B, and 410N each include a touchscreen as an input and output device layer on top of an electronic visual display. This input and output device layer allows for each of processor 408A, 408B, and 408N to determine an overlaying configuration of electronic device 404A, 404B, and 404N. Processor 408A, 408B, and 408N can send the determined overlaying configuration of electronic device 404A, 404B, and 404N to microcontroller 402, where display program 406 can determine an effective display area for display 410A, 410B, and 410N. Electronic device 404N, processor 408N, and display 410N represent an electronic device, processor and display combination further along extendable display strip 400.

Figure 5:
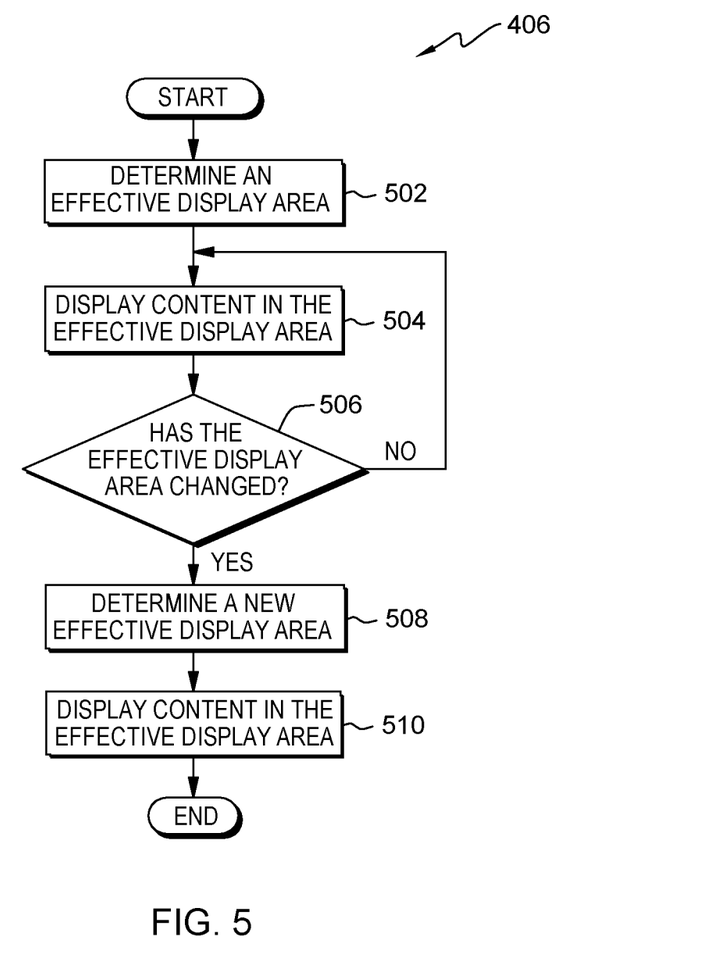
FIG. 5 is a flowchart depicting operational steps of a display program for determining an effective display area of an extendable display strip, in accordance with one embodiment of the present invention.

FIG. 5 is a flowchart depicting operational steps of a display program for determining an effective display area of an extendable display strip, in accordance with one embodiment of the present invention.

Display program 406 determines an effective display area (502). In this embodiment, display program 406 determines an initial effective display area across a plurality of display panels. Display program 406 can query a processors associated with each display panel out of the plurality of display panels to determine an overlaying configuration of the plurality of display panels. For example, a first display panel (e.g., electronic device 404A) overlays a second display panel (e.g., electronic device 404B), where the first display panel covers a portion of the second display panel. The second display panel overlays a third display panel (i.e., electronic device 404N), where the second display panel covers a portion of the third display panel.

A first processor (e.g., processors 408A) of the first display panel can determine via an input and output device layer that no portion of the first display panel is obstructed and the entire first display panel includes a visible portion viewable by a user. A second processor (e.g., processors 408B) of the second display panel can determine via an input and output device layer that an obstructed portion of the second panel is not viewable by the user and a visible portion of the second panel is viewable by the user. A third processor (e.g., processors 408N) of the third display panel can determine via an input and output device layer that an obstructed portion of the third panel is not viewable by the user and a visible portion of the third panel is viewable by the user. Display program 406 can receive this information from the first processor, the second processor, and the third processor and determine an effective display area covering the visible portions of the first display panel, the second display panel, and the third display panel.

Display program 406 displays content in the effective display area (504). In this embodiment, display program 406 displays content in the effective display area covering the visible portions of the first display panel, the second display panel, and the third display panel. In another embodiment, an extendable display strip is a wearable fitness device that is worn on a wrist by a user. Depending on a circumference of the wrist of the user, the extendable display strip expands to form the shape of the wrist and display program 406 can adapt to varying wrist sizes by displaying content in the effective display area based on the visible portions of each display panel. As result, display program 406 can utilize a maximum amount of a display area visible to the user (i.e., effective display area), while conserving power by not displaying any content in a display area not visible to the user.

Display program 406 determines whether the effective display area has changed (506). In the event, display program 406 determines the effective display area has changed ("yes" branch, 506), display program 406 determines a new effective display area (510). In the event, display program 406 determines the effective display area has not changed ("no" branch, 506), display program 406 reverts back to displaying the content in the effective display area (504).

In this embodiment, display program 406 determines whether the effective display area has changed based on information display program 406 receives from the first processor, the second processor, and the third processor of the first display panel, the second display panel, and the third display panel. Since each display panel includes an input and output device layer on top of an electronic visual display, display program 406 has the ability to determine if any one of the display panels is obstructed in such a manner that a portion of the display is no longer visible to the user or is exposed in such a manner that a portion of the display is now visible to the user.

Display program 406 determines a new effective display area (508). In this embodiment, display program 406 determines a new effective display area across the first, the second, and the third display panels. Display program 406 can receive information from the first processor, the second processor, and the third processor and determine the new effective display area covering the visible portions of the first display panel, the second display panel, and the third display panel.

Display program 406 displays content in the new effective display area (510). In this embodiment, display program 406 displays content in the effective display area covering the visible portions of the first display panel, the second display panel, and the third display panel. By displaying content in the new effective display area, display program 406 has the ability to continuously adjustment the display of content in an effective display area that is constantly changing. In one embodiment, display program 406 has the ability to maintain a constant aspect ratio (e.g., 16:9) as an initial effective display area changes to a new effective display area. In another embodiment, display program 406 has the ability to alter content being display to maximize the utilization of the new effective display area. In an example, an extendable display strip is a wearable electronic device worn on a wrist by a first user and the extendable display strip is passed to a second user, where a circumference of a wrist of the second user is greater than a circumference of the wrist of the first user. As a result, display program 406 determines that the display panels on the extendable display strip have extended, thus creating a greater effective display area. Display program 406 has the ability to display content on a larger effective display area by rearranging content to better maximize the utilization of the greater effective display area. For example, content that display program 406 may have been previously displaying in a stacked manner (i.e., multiple lines), can now be displayed in a single line to maximize an increase in length or width provided by the greater effective display area.

Figure 6:
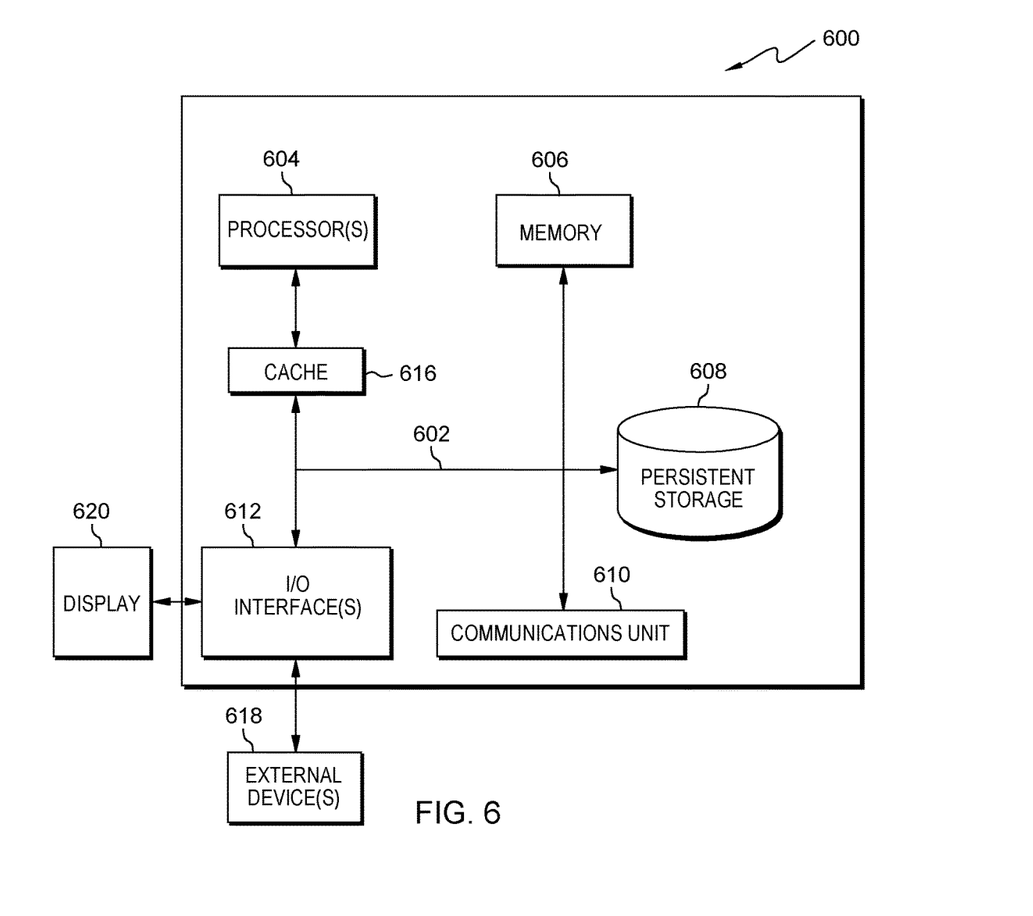
FIG. 6 depicts a block diagram of components of a computer system, such as a microcontroller of FIG. 4, in an embodiment, in accordance with the present invention.

FIG. 6 depicts computer system 600, where embedded microcontroller 404 is an example of a system that includes display program 406. The computer system includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 602 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 606 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for an extendable display strip, the apparatus comprising: a first display panel coupled to a second display panel, wherein the second display panel is capable of extending and retracting beneath a bottom surface of the first display panel; and an elastic base coupled to the first display panel and the second display panel, wherein a first portion of the bottom surface of the first display panel is coupled to the elastic base and a first portion of a bottom surface of the second display panel is coupled to the elastic base, wherein the extending and the retracting of the second display panel beneath the bottom surface of the first display panel is based on an extending and a retracting of the elastic base.

2. The apparatus of claim 1, further comprising:
a first lock of the first display panel, wherein the first lock of the first display panel is coupled to the bottom surface of the first display panel, wherein the first lock of the first display panel is located opposite the first portion of the bottom surface of the first display panel.

3. The apparatus of claim 2, further comprising:
a first lock of the second display panel, wherein the first lock of the second display panel is coupled to a top surface of the second display panel, wherein the first lock of the second display panel is located above the first portion of the bottom surface of the second display panel.

4. The apparatus of claim 3, wherein the first lock of the first display panel is capable of interlocking with the first lock of the second display panel.

5. The apparatus of claim 4, wherein the interlocking of the first lock of the first display panel and the first lock of the second display panel prevents the second display panel from completely extending out beyond the first display panel.

6. The apparatus of claim 1, wherein a top surface of the first display panel includes an anti-rubbing coating.

7. The apparatus of claim 1, wherein a top surface of the second display panel includes an anti-rubbing coating.

8. The apparatus of claim 1, wherein the first display panel includes an embedded magnetic layer and the second display panel includes an embedded magnetic layer, wherein the embedded magnetic layer of the first display panel is a polar opposite of the embedded magnetic layer of the second display panel.

9. The apparatus of claim 1, wherein the first portion of the bottom surface of the first display panel coupled to the elastic base includes a first flexible electrical connector for supplying power to the first display panel, and the first portion of a bottom surface of the second display panel coupled to the elastic base includes a second flexible connector for supplying power to the second display panel.

10. The apparatus of claim 1, further comprising:
a first touch based display on a top surface of the first display panel; and
a second touch based display on a top surface of the second display panel, wherein the second touch based display is capable of detecting when the first display panel covers a portion of the second display panel.

11. The apparatus of claim 1, further comprising:
a third display panel coupled to the second display panel, wherein the third display panel is capable of extending and retracting beneath a bottom surface of the second display panel, wherein the third display panel is coupled to the elastic base.

12. The apparatus of claim 11, wherein the third display panel extending and retracting beneath the bottom surface of the second display is based on the extending and the retracting of the elastic base.

13. The apparatus of claim 12, wherein the third display panel extending and retracting beneath the bottom surface of the second display occurs at a first rate and the second display panel extending and retracting beneath the bottom surface of the first display panel occurs at a second rate.

14. The apparatus of claim 13, wherein a top surface of the third display panel includes an anti-rubbing coating.

15. The apparatus of claim 13, wherein the third display panel includes an embedded magnetic layer, wherein the embedded magnetic layer of the third display panel is a polar opposite of the embedded magnetic layer of the second display panel.

16. The apparatus of claim 13, wherein a first portion of a bottom surface of the third display panel coupled to the elastic base includes a third flexible connector for supplying power to the third display panel.

17. The apparatus of claim 13, further comprising:
a third touch based display on a top portion of the third display panel, wherein the third touch based display is capable of detecting when the second display panel covers a portion of the third display panel.

18. A method comprising:
responsive to determining a bottom lock of a first display panel overlapping a second display panel is not interlocked with a top lock of the second display panel, determining, by one or more processors, an initial effective display area across the first display panel and a portion of the second display panel of at least two display panels of an extendable display strip based on a position of the bottom lock of the first display panel on an input and output device layer of the second display panel;
displaying, by one or more processors, content in the initial effective display area across the at least two display panels, wherein the content is displayed in a stacked manner across the at least two display panels;
responsive to determining the bottom lock of the first display panel overlapping the second display panel is interlocked with the top lock of the second display panel, determining, by one or more processors, the effective area across the at least two display panels has changed;
determining, by one or more processors, a new effective display area greater than the initial effective display area across the first display panel and the second display panel; and
displaying, by one or more processors, content in the new effective display area across the at least two display panels, wherein the content is displayed in a single line across the at least two display panels.

19. A computer system comprising:

one or more computer processors;

one or more computer readable storage media;

program instructions stored on the one or more computer readable storage media, for execution by at least one of the one or more computer processors, the program instructions comprising:

program instructions to, responsive to determining a bottom lock of a first display panel overlapping a second display panel is not interlocked with a top lock of the second display panel, determine an initial effective display area across the first display panel and a portion of the second display panel of at least two display panels of an extendable display strip based on a position of the bottom lock of the first display panel on an input and output device layer of the second display panel;

program instructions to display, content in the initial effective display area across the at least two display panels, wherein the content is displayed in a stacked manner across the at least two display panels;

program instructions to, responsive to determining the bottom lock of the first display panel overlapping the second display panel is interlocked with the top lock of the second display panel, determine the effective area across the at least two display panels has changed;

program instructions to determine a new effective display area greater than the initial effective display area across the first display panel and the second display panel; and program instructions to display content in the new effective display area across the at least two display panels, wherein the content is displayed in a single line across the at least two display panels.

* * * * *